(12) United States Patent  (10) Patent No.: US 9,140,893 B1
Zhao  (45) Date of Patent: Sep. 22, 2015

(54) ELECTROWETTING ARRAY SUBSTRATE AND DISPLAY DEVICE

(71) Applicant: BOE Technology Group Co., Ltd., Beijing (CN)

(72) Inventor: Weili Zhao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/316,070

(22) Filed: Jun. 26, 2014

(30) Foreign Application Priority Data

Apr. 30, 2014 (CN) .......................... 2014 1 0183639

(51) Int. Cl.
*G02B 26/00* (2006.01)
(52) U.S. Cl.
CPC ................................... *G02B 26/005* (2013.01)
(58) Field of Classification Search
CPC .................................................... G02B 26/005
USPC .................................................. 359/290, 291
See application file for complete search history.

(56) References Cited

U.S. PATENT DOCUMENTS

2013/0301106 A1* 11/2013 Jon et al. ..................... 359/290
2013/0301108 A1* 11/2013 Lim et al. .................... 359/290

* cited by examiner

*Primary Examiner* — James Jones
(74) *Attorney, Agent, or Firm* — Westman, Champlin & Koehler, P.A.

(57) ABSTRACT

The disclosure of the present invention relates to an electrowetting array substrate and a display device. The electrowetting array substrate comprises a plurality of pixel units. Each pixel unit comprises a common electrode layer, a pixel electrode layer, a hydrophobic dielectric layer provided between the two electrode layers, a non-polar liquid layer spreading on the hydrophobic dielectric layer, and an aqueous electrolyte layer provided between the non-polar liquid layer and the common electrode layer. a surface of the hydrophobic dielectric layer, on which the non-polar liquid layer spreads, is provided with a groove, and the pixel electrode layer is provided with a through hole the position of which corresponds to that of the groove. With such structure, the spread-contract path of the non-polar liquid can be shortened and thus the response rate can be improved. Furthermore, the non-polar liquid can be confined within the pixel unit.

20 Claims, 3 Drawing Sheets

ELECTROWETTING ARRAY SUBSTRATE AND DISPLAY DEVICE

CROSS-REFERENCE TO RELATED APPLICATION

This application claims the benefit of Chinese Patent Application No. 201410183639.8 filed on Apr. 30, 2014 in the State Intellectual Property Office of China, the whole disclosure of which is incorporated herein by reference.

BACKGROUND OF THE INVENTION

1. Field of the Invention

Embodiments of the present invention relates to the technical field of electrowetting display, and more particular, to an electrowetting array substrate and a display device.

2. Description of the Related Art

In our daily lives, demands for display devices progressively increase, and application products related to the display technique are continually developed. At present, conventional CRT displays have already been replaced by liquid crystal displays. However, such liquid crystal display, due to limitation of its principle, has defects, such as high energy consumption, slow response rate, small angle of visibility, low conversion ratio of color, low contrast and the like, and cannot meet progressively increasing demands of utilization. Accordingly, electrowetting technique is regarded as a new generation of display technique which will replace liquid crystal display technique in the future, owing to its merits of high black/white reflectivity, high conversion ratio of color, high contrast, large angle of visibility, fast response and the like.

Specifically, electrowetting display is a technique which utilizes "spreading-contracting" behaviors of a non-polar liquid on a hydrophobic dielectric layer to realize displaying effect. The operating principle for this is that when no voltage is applied to a pixel unit, the non-polar liquid spreads on a surface of the hydrophobic dielectric layer because an affinity of the non-polar liquid (e.g., black ink) with the hydrophobic dielectric layer is greater than that of a polar aqueous solution (e.g., aqueous electrolyte) with the hydrophobic dielectric layer, and when a voltage is applied to the pixel unit, charge distribution formed on the hydrophobic dielectric layer will enhance its affinity with the water, such that the non-polar liquid is forced to be pushed toward a corner of the pixel unit. Such "spreading-contracting" behavior of the non-polar liquid will be able to generate certain changes of reflection or refraction characteristic of the pixel unit to a light beam, so that different display states are presented.

However, in the electrowetting display device of the prior art, when a voltage is applied to the pixel unit, the non-polar liquid is usually pushed towards the corner of the pixel unit. On one hand, the longest movement distance of the non-polar liquid when converted from the spreading state to the state of being pushed towards the corner is a diagonal distance of the rectangular pixel unit. This will cause unnecessary time and energy consumption and will adversely influence increase of the response rate. On the other hand, after the non-polar liquid contracts to the corner of the pixel unit, the height of the non-polar liquid may be greater than that of a blocking wall. If the display device is strongly vibrated at this time, the non-polar liquid may accidentally enter into adjacent pixel units, causing degradation of displaying effect and even display fault.

SUMMARY OF THE INVENTION

In order to overcome the above mentioned and other technical problems in the prior art, the present invention provides an electrowetting array substrate and a display device including the electrowetting array substrate which not only can shorten a spreading-contracting path of the non-polar liquid and improve the response rate, but also can confine the non-polar liquid within the pixel unit and prevent the non-polar liquid from entering adjacent pixel units due to vibration.

According to embodiments of an aspect of the present invention, there is provided an electrowetting array substrate comprising a plurality of pixel units, wherein each pixel unit comprises a common electrode layer, a pixel electrode layer, a hydrophobic dielectric layer provided between the common electrode layer and the pixel electrode layer, a non-polar liquid layer spreading on the hydrophobic dielectric layer, and an aqueous electrolyte layer provided between the non-polar liquid layer and the common electrode layer. A surface of the hydrophobic dielectric layer, on which the non-polar liquid layer spreads, is provided with a groove, and the pixel electrode layer is provided with a through hole the position of which corresponds to that of the groove.

According to embodiments of another aspect of the present invention, there is provided a display device including the electrowetting array substrate as described above.

REFERENCE NUMBER LIST

Figure 1A:
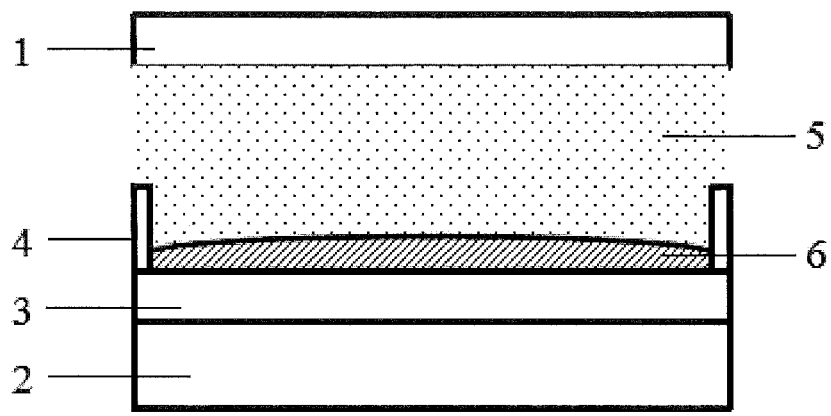
FIGS. 1(a) and 1(b) show a schematic view, in cross-section, of display structure and principle of a pixel unit, in a dark state and in a bright state, of the electrowetting array substrate in the prior art, respectively.

1—common electrode layer; 2—pixel electrode (layer); 3—hydrophobic dielectric layer; 4—hydrophilic blocking wall; 5—aqueous electrolyte (layer); 6—black ink (layer); 7—groove; 8—through hole.

DETAILED DESCRIPTION OF EMBODIMENTS

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In order to explain technical schemes of embodiments of the present invention more explicitly, pixel units of the electrowetting array substrate of the prior art are first described. The specific structure and display principle are described as follows.

Figure 1B:
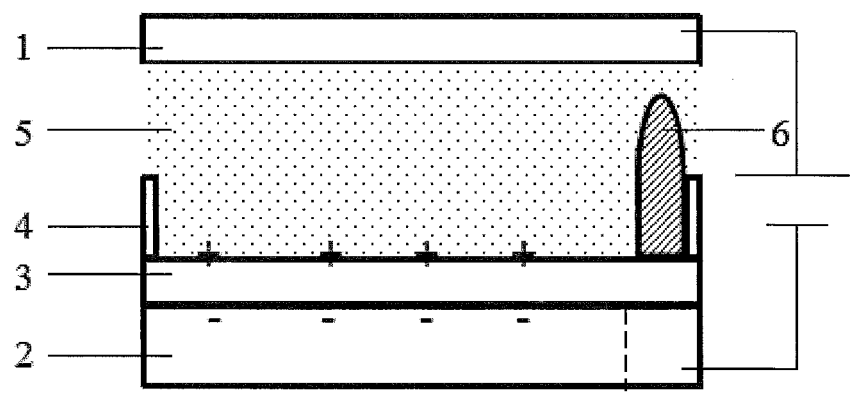

With reference to FIGS. 1(*a*) and 1(*b*), the electrowetting array substrate of the prior art comprises a plurality of pixel units. Each pixel unit includes a common electrode layer 1, a pixel electrode layer 2, and an aqueous electrolyte layer 5 and a hydrophobic dielectric layer 3 respectively located between the two electrode layers 1 and 2. In the aqueous electrolyte layer 5, there is provided a non-polar liquid layer 6 which spreads on a surface of the hydrophobic dielectric layer 3. At a boundary of the surface of the hydrophobic dielectric layer 3, there is provided a hydrophilic blocking wall 4 used for confining the non-polar liquid within the pixel unit. The non-polar liquid may be a black ink.

The display principle of the pixel units of the prior art is described as follows. As an example, the black ink is used as the non-polar liquid.

Figure 2A:
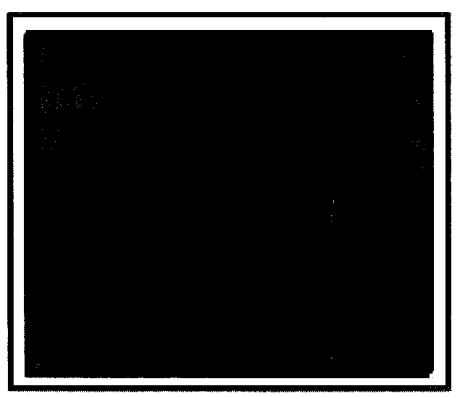
FIGS. 2(a) and 2(b) show a schematic view of display effects of a pixel unit, in a dark state and in a bright state, of the electrowetting array substrate of the prior art, respectively.
Figure 2B:
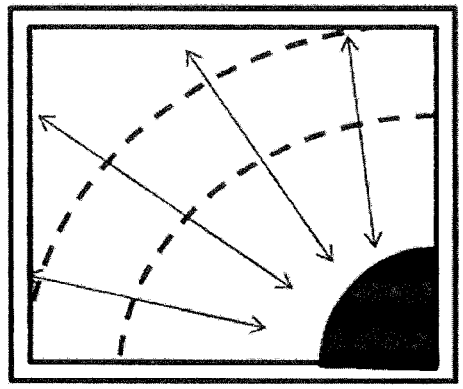

With reference to FIG. 1(*a*), when no voltage is applied, the black ink layer 6 spreads on the surface of the hydrophobic dielectric layer 3 of the pixel unit. An ambient light or a light from a backlight source incident upon the black ink layer 6 is absorbed, and thus a dark state is presented (as shown in FIG. 2(*a*)). With reference to FIG. 1(*b*), when a voltage is applied, a charge distribution is formed on the hydrophobic dielectric layer 3, so that the aqueous electrolyte layer 5 and the surface of the hydrophobic dielectric layer 3 contact with each other as a result of a good affinity between the aqueous electrolyte layer 5 and the surface of the hydrophobic dielectric layer 3. In this way, the black ink 6 is forced to be pushed to a corner of the pixel unit. At this time, if the pixel unit is reflective, the ambient light is incident upon the portion of the pixel unit where no black ink is present and is reflected back by a reflection sheet, thereby displaying a bright state; if the pixel unit is transmissive, the light is transmitted through the portion of the pixel unit where no black ink is present, as a result, a bright state is displayed. The corner at which the contracted black ink 6 is located absorbs the light to display a dark state (as shown in FIG. 2(*b*)).

As shown in FIGS. 2(*a*) and 2(*b*), the conversion of the black ink 6 from the spreading state to the contracting state is realized by applying a voltage to form a charge distribution on the surface of the hydrophobic dielectric layer 3 so as to enhance hydrophilicity of the surface of the hydrophobic dielectric layer 3, and then pushing the black ink 6 by means of the aqueous electrolyte 5 to move towards the corner where no charge is present. The movement path is indicated by arrows shown in the FIG. 2(*b*). The longest contracting path from three corners of the rectangular structure of the pixel unit to the other one corner thereof is a diagonal distance of the rectangular pixel unit. Given that the diagonal length of the rectangular pixel unit is 1, the longest contracting path is also 1. In reverse, when application of the voltage is stopped, the movement path caused due to the conversion from the contracting state to the spreading state is also 1.

Obviously, such spread-contract movement will cause unnecessary time and energy consumption and thus adversely influence increase of the response rate. On the other hand, after the non-polar liquid contracts to the corner of the pixel unit, the height of the non-polar liquid may be greater than that of the blocking wall. If the display device is strongly vibrated at this time, the non-polar liquid may accidentally enter into adjacent pixel units, causing degradation of displaying effect and even display fault.

The embodiments of the present invention make an improvement on the electrowetting array substrate of the prior art. Specifically, according to an embodiment of one aspect of the present invention, there is provided an electrowetting array substrate comprising a plurality of pixel units. Each pixel unit comprises a common electrode layer 1, a pixel electrode layer 2, a hydrophobic dielectric layer 3 provided between the common electrode layer 1 and the pixel electrode layer 2, a non-polar liquid layer 6 spreading on the hydrophobic dielectric layer 3, and an aqueous electrolyte layer 5 provided between the non-polar liquid layer 6 and the common electrode layer 1. The surface of the hydrophobic dielectric layer 3, on which the non-polar liquid layer 6 spreads, is provided with a groove 7, and the pixel electrode layer 2 is provided with a through hole 8 the position of which corresponds to the groove 7.

In an embodiment, the electrowetting array substrate further comprises a hydrophilic blocking wall 4 provided at a boundary of the surface of the hydrophobic dielectric layer 3 and used for confining the non-polar liquid within the pixel unit. In an embodiment, the non-polar liquid is a black ink.

The difference between the operational principle of the embodiments of the present invention and that of the prior art is described as follows.

After a voltage is applied, a charge distribution is formed on the hydrophobic dielectric layer 3 around the groove 7, so that the aqueous electrolyte 5 and the hydrophobic dielectric layer 3 contact with each other as a result of a good affinity between the aqueous electrolyte 5 and the hydrophobic dielectric layer 3. In this way, the non-polar liquid (e.g., the black ink) is pushed into the groove 7. Since the through hole 8 is provided at a portion of the pixel electrode corresponding to the groove 7, that is to say, the pixel electrode of the pixel unit does not apply a voltage to the groove 7, there is no change in hydrophilicity on an inner surface of the groove and hence the non-polar liquid around the groove can be pushed into the groove more easily, more compactly and more stably.

In this way, the spread-contract path of the non-polar liquid (e.g., the black ink) is changed from "along the diagonal" to "from corners to the center". Thus, the spread-contract path of the non-polar liquid can be shortened and the response rate can be improved. Furthermore, since the non-polar liquid is not close to the blocking wall any more, when being vibrated, the non-polar liquid is unlikely to enter adjacent pixel units and thus can be prevented from entering adjacent pixel units due to vibration. Moreover, since a part of the non-polar liquid is located into the groove, the height of the non-polar liquid above the surface of the hydrophobic dielectric layer is lower than the height as designed in the prior art and thus the thickness of the display device can be reduced.

In a preferred embodiment, a cross-section of the groove is in a circular or elliptical shape. Such configuration takes the fact that the non-polar liquid will circularly or elliptically contact with the hydrophobic dielectric layer naturally when being pushed, into consideration. Therefore, the arrangement of the groove in a circular or elliptical shape can further shorten the spread-contract path of the non-polar liquid and can improve the stability of the non-polar liquid in a pushed state.

In a preferred embodiment, the non-polar liquid is the black ink. It should be noted that other liquid having the same or similar hydrophobicity and/or optical properties may be used.

In a preferred embodiment, the depth of the groove is not greater than the thickness of the hydrophobic dielectric layer of the pixel unit. This configuration not only takes into consideration one aspect that the groove is provided in the hydrophobic dielectric layer and its depth cannot be greater than the thickness of the hydrophobic dielectric layer, but also another aspect that upper and lower surfaces of the hydrophobic dielectric layer are needed to keep a certain charge distribution. If the depth of the groove is too deep, such charge distribution will be destroyed. Also, if the depth of the groove is too deep and thus a through hole extending through the hydrophobic dielectric layer is formed, the non-polar liquid will not be attached at the groove when a voltage is not applied, and the water will contact with the pixel electrode, so that the display effect in the dark state will be adversely influenced (no display at the groove). Further, when a voltage is applied, the liquid at the groove electrically connects the upper electrode of the hydrophobic dielectric layer with the lower electrode thereof, causing a short circuit. Therefore, the depth of the groove cannot be greater than the thickness of the hydrophobic dielectric layer.

In a preferred embodiment, on the surface of the hydrophobic dielectric layer, the groove is not conterminous or tangent with a boundary of the surface of the hydrophobic dielectric layer. This design takes two aspects into consideration. Firstly, if the groove is conterminous or tangent with the boundary of the surface of the hydrophobic dielectric layer, there is difficulty in processing and manufacturing. Secondly, such design aims to provide an anchoring point for contracting of the non-polar liquid not in the vicinity of the boundary of the surface of the hydrophobic dielectric layer, so that the spread-contract path of the non-polar liquid can be shortened and the non-polar liquid is unlikely to enter into adjacent pixel units when being vibrated.

In a preferred embodiment, a central point of the groove coincides with that of the pixel unit. Such design takes optimization into consideration. The groove is provided at the center of the surface of the hydrophobic dielectric layer, so that the spread-contract path of the non-polar liquid can be shortened to the minimum of ½. At the same time, the distance of the groove from the blocking wall will be farthest, and thus the non-polar liquid is more unlikely to enter into adjacent pixel units.

In a preferred embodiment, the through hole in the pixel electrode layer of the pixel unit has the same shape as that of the groove. That is to say, only the portion where the groove is located, on the pixel electrode of the pixel unit, is not applied with a voltage. In this way, no change in hydrophilicity occurs on the inner surface of the groove, and the other portion of the surface of the hydrophobic dielectric layer is subjected to change in hydrophilicity, so that the non-polar liquid around the groove can be pushed into the groove more easily, more compactly and more stably.

In a preferred embodiment, the area of the cross-section of the groove is 15% to 30% of the area of the pixel unit. Such configuration takes a general size of a pixel unit, the total volume of the liquid used and a predetermined value of the area obtained in combination with experiments into consideration. In fact, such configuration of the area not only can facilitate processing and manufacturing of the pixel unit, but also can improve the display effect when the non-polar liquid is pushed.

More preferably, the depth of the groove is ⅓ to ½ of the thickness of the hydrophobic dielectric layer of the pixel unit. Similar to the above predetermined value of the area, such predetermined value also relates to a predetermined range obtained in combination with theory and experiments. In a similar way, such configuration not only can facilitate processing and manufacturing of the pixel unit, but also can improve the display effect when the non-polar liquid is pushed. Furthermore, in combination with the above, when the depth of the groove is set as being ⅓ to ½ of the thickness of the hydrophobic dielectric layer, a normal charge distribution on the upper and lower surfaces of the hydrophobic dielectric layer can be ensured, and in a dark state the non-polar liquid can be prevented from entirely piling into the groove to adversely influence the display effect. The more important is that this configuration remarkably reduces the height of the top of the non-polar liquid in the contract state, so that the thickness of the display device can be reduced and the whole display device can be lightened and thinned.

Next, in order to explain the technical schemes of the embodiments of the present invention more explicitly, an electrowetting array substrate incorporated with all of the above preferred features is exemplarily described. Its structure and principle (in order to facilitate comparison with the electrowetting array substrate of the prior art, the basic structure of pixel unit and the black ink layer adopted herein are the same as those of the prior art, but they only are used by way of an example) are described as follows.

Figure 3A:
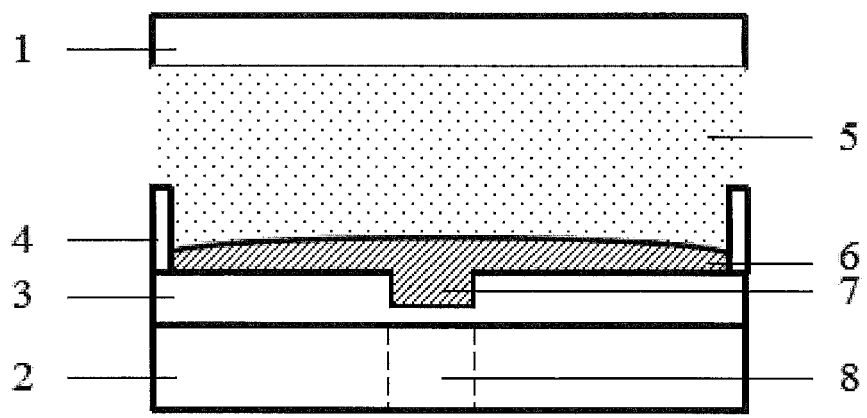
FIGS. 3(a) and 3(b) show a schematic view, in cross-section, of display structure and principle of a pixel unit, in a dark state and in a bright state, of the electrowetting array substrate according to an embodiment of the present invention, respectively.
Figure 3B:
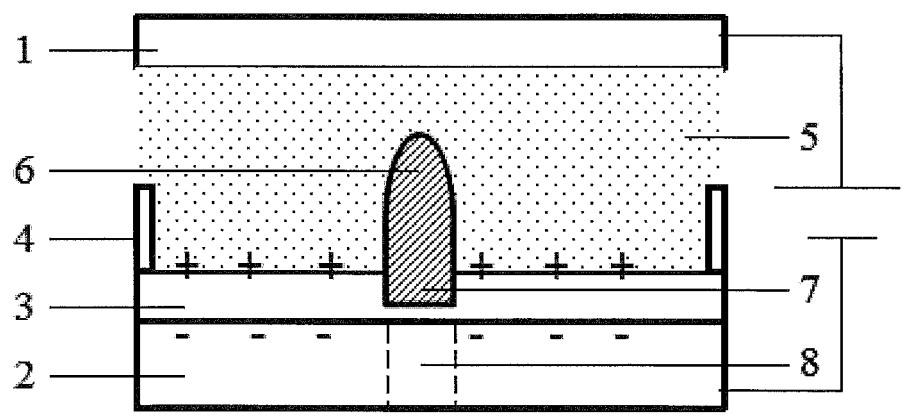

With reference to FIGS. 3(a) and 3(b), in the embodiment of the present invention, on the basis of the electrowetting array substrate of the prior art, the circular or elliptical groove 7 is etched and formed at the center of the surface of the hydrophobic dielectric layer 3 of the pixel unit. The area of the cross-section of the groove is 15% to 30% of the area of the rectangular pixel unit. The depth of the groove is ⅓ to ½ of the thickness of the hydrophobic dielectric layer 3. Correspondingly, the through hole 8 having the same shape as that of the groove 7 is etched and formed in the pixel electrode 2. The etched depth of the through hole 8 is equal to the thickness of the pixel electrode layer 2 (as shown by dash lines).

Figure 4A:
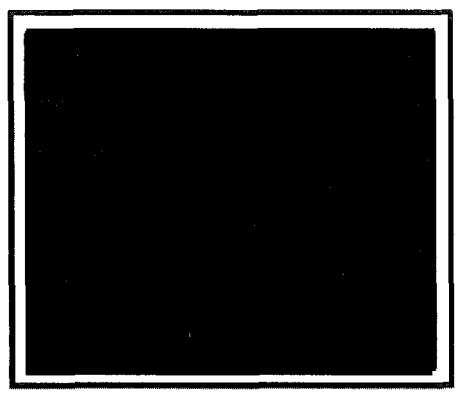
FIGS. 4(a) and 4(b) show a schematic view of display effects of a pixel unit, in a dark state and in a bright state, of the electrowetting array substrate according to an embodiment of the present invention, respectively.

When no voltage is applied, the black ink layer 6 spreads on the surface of the hydrophobic dielectric layer 3 of the pixel unit. The ambient light or the light from the backlight source incident upon the black ink layer 6 is absorbed, and thus a dark state is presented (as shown in FIG. 4(a)).

When a voltage is applied, a charge distribution is formed on the hydrophobic dielectric layer 3. Since the groove 7 is formed at the center of the hydrophobic dielectric layer 3 and the through hole 8 is formed at the center of the pixel electrode 2, there is no charge distribution on the portion of the surface of the hydrophobic dielectric layer 3 at which the groove 7 is formed, and the charges are distributed on the other portion of the surface of the hydrophobic dielectric layer 3 than the portion at which the groove 7 is formed. At the portion on which the charges are distributed, the aqueous electrolyte 5 and the surface of the hydrophobic dielectric layer 3 contact with each other as a result of a good affinity between the aqueous electrolyte 5 and the surface of the hydrophobic dielectric layer 3, so that the black ink layer 6 is forced to be pushed to the circular or elliptical groove 7 provided at the center of the pixel unit, because there still is hydrophilicity at the groove 7. If the pixel unit is reflective, the ambient light illuminates upon the portion of the pixel unit where no black ink layer 6 is present and is reflected back by a reflection sheet, thereby displaying a bright state, and the portion where the contracted black ink 6 is present absorbs the light, thereby presenting a dark state; if the pixel unit is transmissive, the light is transmitted through the portion of the pixel unit where no black ink 6 is present and the bright state is displayed, and the portion where the contracted black ink 6 is present absorbs the light to present the dark state. In this case, since the ratio of the area of the groove to the area of the whole surface of the hydrophobic dielectric layer is small, even though the dark state is presented at the groove, the pixel unit, as a whole, presents the bright state.

Figure 4B:
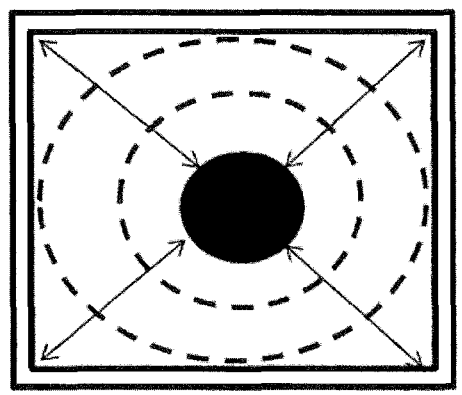

It should be pointed out that, as shown in FIGS. 3(a) and 3(b), the conversion of the black ink 6 from the spreading state to the contracting state is realized by applying a voltage to form the charge distribution on the surface of the hydrophobic dielectric layer 3 so as to enhance hydrophilicity of the surface of the hydrophobic dielectric layer 3 and then pushing the black ink 6 by means of the aqueous electrolyte 5 to move towards the central circular groove 7 where no charge is distributed. The movement path is indicated by arrows shown in the FIG. 4(b). The longest contracting path from four corners of the rectangular pixel unit to the center thereof is half of a diagonal distance of the rectangular pixel unit. Given that the length of the diagonal of the rectangular pixel unit is 1, the longest contracting path is 0.51. In reverse, when application of the voltage is stopped, the path caused due to the conversion from the contracting state to the spreading state is also 0.51. Furthermore, when the black ink 6 contracts to the center of the pixel unit, the black ink can be prevented from entering adjacent pixel units due to vibration. Moreover, since a part of the black ink 6 is located into the groove 7, the height of the black ink 6 above the surface of the hydrophobic dielectric layer 3 is lower than the height as designed in the prior art and thus the thickness of the display device can be reduced.

It should be noted that one skilled in the art can envisage modifications to provide a groove having another shape other than circular or elliptical shape, other areas of cross-section, other depths or any other features on other portions of the hydrophobic dielectric layer apart from the center thereof, or to use other non-polar liquid or other basic structures of the pixel unit, as long as those modifications of the electrowetting array substrate according to the embodiments of the present invention have the same feature, that is, a groove is provided on the surface of the hydrophobic dielectric layer and a through hole, the position of which corresponds to the groove, is provided in the pixel electrode layer, and those modifications can solve the same technical problem and achieve the same or similar technical effects. Those modifications fall within the spirit and scope of the technical schemes of the embodiments of the present invention.

Based on the same inventive concept, any of the embodiments of the present invention provide a display device comprising any one of the above mentioned electrowetting array substrates. The display device may be any products or components having display function, such as electric paper, cell phones, flat computers, TVs, displays, notebook computers, digital picture frames, navigators and the like.

Since the display device according to the embodiments of the present invention has the same features as any one of the above described electrowetting array substrates has, the display device can solve the same technical problem and can achieve the same technical effects.

Concerning the above, in the present invention, based on the electrowetting array substrate of the prior art, a groove is provided on a surface of the hydrophobic dielectric layer of the pixel unit, and a through hole, the position of which corresponds to the groove, is provided in the pixel electrode layer of the pixel unit. In this way, the foregoing problems existed in the prior art are overcome. The spread-contract path of the non-polar liquid can be shortened and the response rate can be improved. Furthermore, the non-polar liquid is confined within the pixel unit and can be prevented from entering adjacent pixel units due to vibration.

The above described embodiments are only used to explain the concept of invention of the present invention, and should not be regarded as a limit to the present invention. It would be appreciated by those skilled in the art that various changes and substitutions may be made without departing from the principle and spirit of the disclosure. Such changes and substitutions fall into the scope of the disclosure.

What is claimed is:

1. An electrowetting array substrate, comprising:
   a plurality of pixel units, wherein each pixel unit comprises
      a common electrode layer;
      a pixel electrode layer;
      a hydrophobic dielectric layer, provided between the common electrode layer and the pixel electrode layer;
      a non-polar liquid layer, spreading on the hydrophobic dielectric layer; and
      an aqueous electrolyte layer, provided between the non-polar liquid layer and the common electrode layer,
      wherein a surface of the hydrophobic dielectric layer, on which the non-polar liquid layer spreads, is provided with a groove, and the pixel electrode layer is provided with a through hole the position of which corresponds to that of the groove.

2. The electrowetting array substrate according to claim 1, wherein a cross-section of the groove is in a circular or elliptical shape.

3. The electrowetting array substrate according to claim 1, wherein non-polar liquid in the non-polar liquid layer is black ink.

4. The electrowetting array substrate according to claim 1, wherein a depth of the groove is not greater than a thickness of the hydrophobic dielectric layer.

5. The electrowetting array substrate according to claim 4, wherein the depth of the groove is ⅓ to ½ of the thickness of the hydrophobic dielectric layer.

6. The electrowetting array substrate according to claim 1, wherein on the surface of the hydrophobic dielectric layer, the groove is not conterminous or tangent with a boundary of the surface of the hydrophobic dielectric layer.

7. The electrowetting array substrate according to claim 1, wherein a central point of the groove coincides with that of the pixel unit.

8. The electrowetting array substrate according to claim 1, wherein a shape of the through hole of the pixel electrode layer is identical with that of the groove.

9. The electrowetting array substrate according to claim 1, wherein an area of the cross-section of the groove is 15% to 30% of an area of the pixel unit.

10. The electrowetting array substrate according to claim 2, wherein an area of the cross-section of the groove is 15% to 30% of an area of the pixel unit.

11. The electrowetting array substrate according to claim 5, wherein an area of the cross-section of the groove is 15% to 30% of an area of the pixel unit.

12. The electrowetting array substrate according to claim 6, wherein an area of the cross-section of the groove is 15% to 30% of an area of the pixel unit.

13. The electrowetting array substrate according to claim 7, wherein an area of the cross-section of the groove is 15% to 30% of an area of the pixel unit.

14. The electrowetting array substrate according to claim 1, wherein the pixel unit further comprises a hydrophilic blocking wall provided at a boundary of the surface of the hydrophobic dielectric layer and used for confining non-polar liquid in the non-polar liquid layer within the pixel unit.

15. A display device, comprising the electrowetting array substrate according to claim 1.

16. The display device according to claim 15, wherein a cross-section of the groove is in a circular or elliptical shape.

17. The display device according to claim 15, wherein a depth of the groove is ⅓ to ½ of a thickness of the hydrophobic dielectric layer.

18. The display device according to claim 15, wherein on the surface of the hydrophobic dielectric layer, the groove is not conterminous or tangent with a boundary of the surface of the hydrophobic dielectric layer.

19. The display device according to claim 15, wherein a central point of the groove coincides with that of the pixel unit.

20. The display device according to claim 15, wherein an area of the cross-section of the groove is 15% to 30% of an area of the pixel unit.

\* \* \* \* \*